Figure 1:
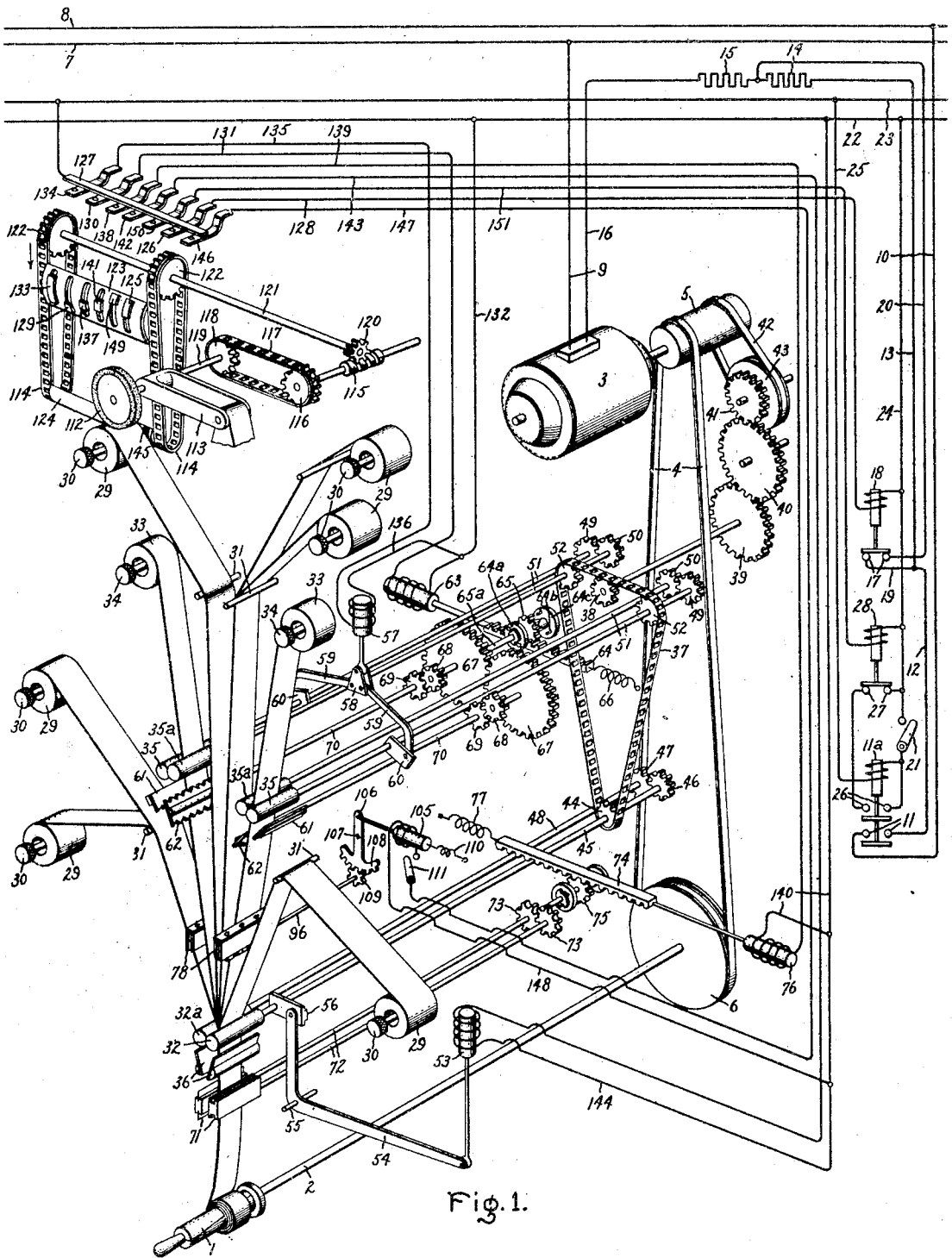

Aug. 31, 1943.　　　　C. S. WEST　　　　2,328,520
CONDENSER WINDING MACHINE
Filed May 28, 1940　　　2 Sheets-Sheet 1

Inventor:
Clifford S. West,
by Harry E. Dunham
His Attorney.

Aug. 31, 1943.  C. S. WEST  2,328,520
CONDENSER WINDING MACHINE
Filed May 28, 1940  2 Sheets-Sheet 2
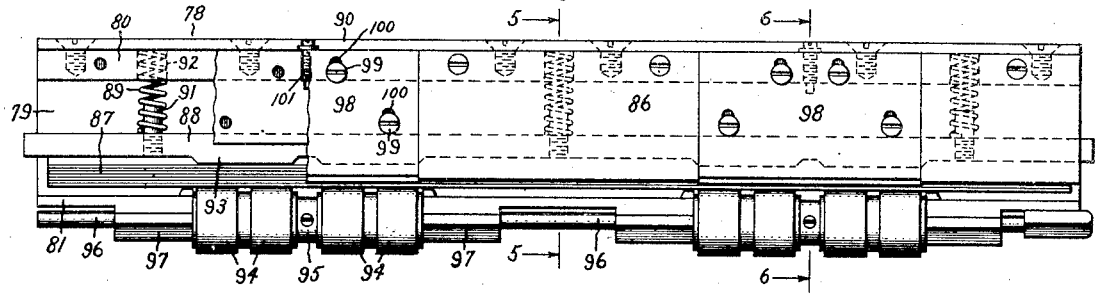
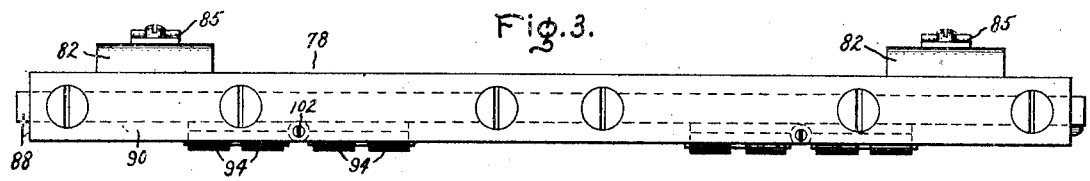
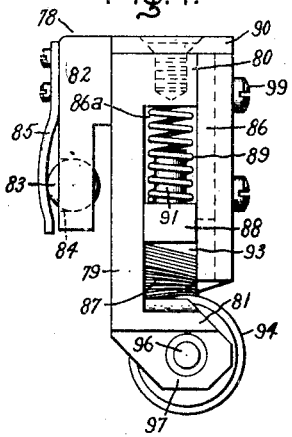
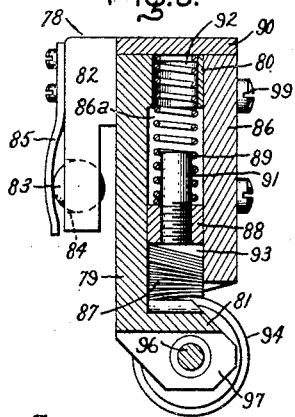
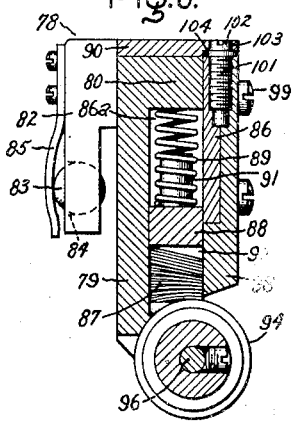
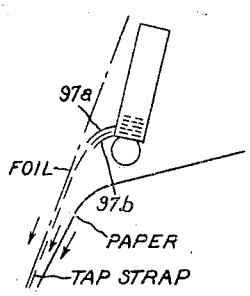
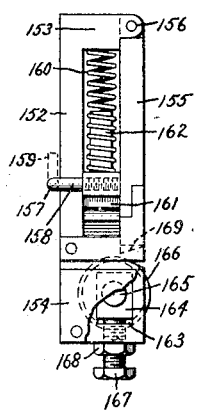
Inventor:
Clifford S. West,
by Harry E. Dunham
His Attorney.

Patented Aug. 31, 1943

2,328,520

UNITED STATES PATENT OFFICE 2,328,520

CONDENSER WINDING MACHINE

Clifford S. West, Adams, Mass., assignor to General Electric Company, a corporation of New York Application May 28, 1940, Serial No. 337,615

8 Claims. (Cl. 242—56)

The present invention relates to machines for automatically winding electrical condensers of the coil type.

The object of my invention is to provide an improved construction and arrangement in machines of this type for inserting or positioning the tap straps, conducting leads or terminals, and for a consideration of what I believe novel and my invention, attention is directed to the following description and the claims appended thereto.

In the accompanying drawings, Fig. 1 is a diagrammatic view of a condenser winding machine embodying my invention; Fig. 2 is a front elevation of the tap strap ejector; Fig. 3 is a top plan view of the tap strap ejector; Fig. 4 is an end elevation of the tap strap ejector; Fig. 5 is a sectional view on line 5—5 of Fig. 2; Fig. 6 is a sectional view on line 6—6 of Fig. 2; Fig. 7 is an end elevation of a modification of the tap strap ejector; and Fig. 8 is a diagram illustrating the movement of the tap strap after ejection.

My invention is shown as being embodied in a condenser winding machine of the type shown in application Serial No. 304,787, filed November 16, 1939, now Patent No. 2,255,498, issued September 9, 1941. The condenser is wound on a split mandrel 1 mounted on a shaft 2 driven by an electric motor 3 by means of a belt 4 running over a pulley 5 fixed to the motor shaft and a pulley 6 fixed to the mandrel shaft. Power is supplied to the motor through line conductors 7 and 8, the line conductor 7 being connected to the motor through a conductor 9 and the line conductor 8 being connected to the motor through conductor 10, normally open contacts 11 of a solenoid 11a, conductors 12 and 13, resistances 14 and 15, and conductor 16. The resistance 14 is normally short-circuited through the normally closed contacts 17 of a solenoid 18, the contacts being respectively connected by a conductor 19 to the junction of the conductors 12 and 13 and by a conductor 20 to the junction of the resistances 14 and 15. When the resistance 14 is short-circuited, the motor runs at full speed. When the resistance 14 is open-circuited by the energizing of the solenoid 18 to open the contacts 17, the additional resistance inserted in the motor supply circuit causes the motor to run at a slower speed.

The motor is started by a manually operated switch 21 connected in the circuit of the solenoid 11a. The solenoid is energized from a low voltage supply comprising conductors 22 and 23. One side of the switch 21 is connected by a conductor 24 to the conductor 22. The other side of the switch is connected to the solenoid 11a and through the conductor 25 to the conductor 23. Upon closing the switch 21 the solenoid 11a is energized, causing the closure of the contacts 11 to energize the motor and also closing contacts 26 to energize a holding circuit for the solenoid 11a extending from the conductor 22, through the conductor 24, through normally closed contacts 27 of a solenoid 28, through contacts 26 to the solenoid 11a, and from the solenoid through conductor 25 to the supply conductor 23. As soon as the solenoid 11a has been operated the switch 21 may be opened and the solenoid will be held in its closed position due to the establishment of the holding circuit described above. The motor is stopped by energizing the solenoid 28, opening the contacts 27, and breaking the holding circuit for the solenoid 11a. As soon as this happens the solenoid 11a returns to the position illustrated in which the contacts 11 and 26 are open.

The condenser comprises layers of foil with interposed layers of paper. The paper is fed to the mandrel from rolls 29 rotatably carried on spindles 30. The paper passes to the mandrel over guides 31 and between paper feed rolls 32 and 32a. The foil is fed to the mandrel from rolls 33 rotatably carried on spindles 34. The foil passes to the mandrel between foil feed rolls 35 and 35a and also between the paper feed rolls 32 and 32a. Stationary guides 36 are arranged below the feed rolls 32. The feed rolls 32 and 32a and 35 and 35a are normally separated and, in such position, are ineffective to feed the paper or foil even though rotated. The paper and foil, accordingly, are unwrapped from the respective rolls and wound on the mandred at a speed depending upon the diameter of the paper and foil wrapped on the mandrel, and the R. P. M. of shaft 2.

The paper and foil feed rolls are driven by a chain 37 which is driven by the motor through a gear train comprising gears 38, 39, 40, and 41 by means of a belt 42 running over the pulley 5 fixed to the motor shaft and a pulley 43 fixed to the gear 41. The speed at which the chain is driven is accordingly directly proportional to the motor speed and adjustably selected so that paper and foil will be fed at a rate approximately equal to the speed of the dielectric at the end of the winding. The paper feed rolls 32 and 32a are driven from the chain through a gear 44 fixed to the shaft 45 of the roll 32 and through gears 46 and 47 respectively fixed to the shaft 45 and to the shaft 48 of the feed roll 32a. The gears 44, 46 and 47 are of the same size, and the rolls 32 and 32a accordingly are positively driven at the same speed and in opposite directions. The foil feed rolls 35 and 35a are driven by gears 49 and 50 fixed to the feed roll shafts 51. Fixed to one of each pair of the feed roll shafts is a gear 52 meshing with the chain 37. The gears 49, 50, and 52 are of the same size as the paper feed roll gears 44, 46, and 47, and the foil feed rolls are accordingly positively driven in opposite directions at the same speed as the paper feed rolls. Since the feed roll speed is fixed, the surface speed of the feed rolls may be greater or less than the surface speed of the condenser coil being wrapped on the mandrel, depending upon the diameter of the condenser being wound. Preferably the feed roll speed is such that the paper and foil will be fed by the respective feed rolls at a speed substantially equal to the speed of the paper at the end of the winding.

The paper feed rolls 32 and 32a are rendered effective to feed paper toward the mandrel by moving the roll 32 into engagement with the roll 32a. This is effected by means of a solenoid 53 connected to one end of a bell crank lever 54 pivoted at 55. The other end of the bell crank lever 54 is connected to a slide 56 suitably guided in a manner not shown and journaled on the shaft 45 of the roll 32. When the solenoid 53 is energized, the bell crank lever 54 is pivoted in a counterclockwise direction about the pivot 55, causing the slide 56 to be moved toward the roll 32a and moving the roll 32 into engagement with the roll 32a. When the solenoid 53 is deenergized, the parts are returned by gravity to the position illustrated in which the roll 32 is separated from the roll 32a.

The foil feed rolls 35 and 35a are rendered effective to feed foil toward the mandrel by a solenoid 57 connected at its lower end to a block 58 on which are pivoted the inner ends of links 59. The outer ends of the links 59 are pivotally connected to slides 60 suitably guided in a manner not shown and respectively journaled on the shafts 51 of the rolls 35. When the solenoid 57 is energized, the inner ends of the links 59 are lifted, causing the outer ends of the links to move toward the shafts of the rolls 35a. The slides 60 connected to the outer ends of the links 59 accordingly move the rolls 35 into engagement with the rolls 35a and render the rolls effective to feed foil toward the mandrel. When the solenoid 57 is deenergized, the parts are returned by gravity to the position illustrated in which the rolls 35 are separated from the rolls 35a.

Below each of the foil feed rolls 35 and 35a are cutters each comprising a stationary cutter blade 61 and a rotatable cutter blade 62. The foil is cut by rotation of the cutters 62 to a position cooperating with the stationary cutters 61. This is effected by means of a solenoid 63 having a rack 64 meshing with a pinion 65 loose on shaft 65a. A ratchet described in the above application connects the pinion 65 and the shaft 65a so that the shaft is rotated when the rack 64 moves to the left and remains stationary when the rack moves to the right. The solenoid is biased to the position illustrated by a spring 66 connected to the free end of the rack 64. When the solenoid 63 is energized, the rack 64 is moved to the left, causing the gear 65 to be rotated in a clockwise direction, as viewed in Fig. 1. The ratchet is then effective to rotate the shaft 65a in unison with the gear 65, causing the cutters 62 to be rotated through gears 67, 68, and 69. The rotation of the cutters 62 is limited to a half revolution by the engagement of a stop 64a on the rack 64 with one of the stops 64b on a disk 64c integral with the gear 65. The gears 69 are fixed to the shafts 70 carrying the rotatable cutters 62. When the solenoid 63 is deenergized, the rack 64 is moved to the right by the spring 66, returning the rack 64 to the position illustrated. During the return movement of the rack 64, the shaft 65a remains stationary since the ratchet is ineffective during the reverse rotation of the gear 65. The cutters 62 accordingly remain stationary.

Below the stationary guides 36 are paper cutters comprising rotatable knives 71 fixed to shafts 72. The knives 71 are rotated in opposite directions by gears 73 fixed to the shafts 72, one of the shafts being rotated by a rack 74 meshing with a pinion 75 connected thereto by a ratchet drive of the same construction as that used in the foil cutter. One end of the rack is connected to a solenoid 76, and the other end of the rack is connected to a tension spring 77 biasing the rack to the position illustrated. When the solenoid 76 is energized, the rack 74 is moved to the right, causing the knives 71 to be rotated in opposite directions a half revolution to sever the paper. When the solenoid 76 is deenergized, the rack 74 is returned to the position illustrated by the tension spring 77. The cutters remain stationary during the return movement of the rack due to the ratchet connection between the shaft 72 and the pinion 75.

Below the foil cutters and between adjacent strips of foil and paper are tap strap ejectors 78 shown in detail in Figs. 2 to 6 inclusive. The ejector comprises a channel-shaped frame having a vertical back wall 79 provided with upper and lower flanges 80 and 81. Fixed on the rear side of the back wall 79 are supporting brackets 82 adapted to be hooked over suitable supports (not shown). The brackets are releasably held on the supports by ball detents 83 retained in sockets 84 by strip springs 85. Fixed to the front edge of the flange 80 is a plate 86 forming the front wall of a rectangular recess 86a receiving a stack of tap straps or terminals 87. Tap straps are tinned strips of copper or other suitable conducting metal having a length somewhat greater than the width of the foil adapted to be arranged between the foil and paper with the ends projecting to serve as leads for making connections to the condenser. The stack of tap straps is urged toward the bottom flange 81 by a pressure bar 88 slidable in the recess 86a. The pressure exerted by the bar 88 is derived from coil springs 89 arranged between the upper side of the bar and a plate 90 fixed to the top of the flange 80. The lower ends of the springs are arranged around studs 91 threaded in the bar 88 and the upper ends of the springs are arranged in sockets 92 in the flange 80. The studs 91 and the sockets 92 prevent buckling of the springs. On the lower surface of the pressure bar are projections 93 which, as shown in Figs. 4 to 6, are inclined upwardly from the front plate 86 toward the back wall 79. The projections provide localized points of pressure on the stack of tap straps, the pressure being greatest adjacent the front plate 86. Adjacent the back wall 79 and between the projections 93, the pressure bar exerts substantially no pressure on the tap straps. Directly beneath each of the projections 93 is a pair of rubber faced friction rolls 94 fixed on a hub 95 in turn fixed to a shaft 96 rotatably carried in bosses 97 on the under side of the bottom flange 81. The center of the shaft 86 is toward the front plate 86, and is preferably arranged so that the center of the contact of the wheels 94 with the bottom of the stack of tap straps is from 15 to 25% from the front plate 86, or, in other words, from 75 to 85% from the back wall 79. The tap straps accordingly are squeezed together at the front edges between the projections 93 and the rolls 94 and the rear edges, which are subjected to practically no pressure, "fan" or "broom" outward, as shown in Figs. 4 to 6. The brooming of the strips, which is an important feature, is also obtained in part from the inclination of the projections 93. This inclination is of the order of from 2° to 8° from the horizontal. When the rolls 94 are rotated in a clockwise direction, as viewed in Fig. 4, the lowermost tap strap will be frictionally gripped by the rubber surface of the rolls and propelled through the slot between the lower edge of the plate 86 and the upper surface of the flange 81. Throughout the greater portion of the length of the tap strap ejector this slot has a width equal to the thickness of several tap straps. Directly above the friction rolls 94 the slot is limited to a width slightly greater than the thickness of a single tap strap but less than the thickness of two straps by adjustable gauge plates 98 vertically slidable in recesses in the front face of the plate 86. The gauge plates are held in the recesses by screws 99 threaded into the plate 86 and extending through elongated slots 100 in the gauge plates. The vertical position of the gauge plates is adjusted by adjusting screws 101 having heads 102 fitting in circular openings 103 in the plate 90. The heads 102 are provided with circular flanges 104 which fit in circular recesses in the under side of the plate 90 and prevent upward movement of the adjusting screws. The threaded portion of the adjusting screws cooperates with threads formed in semi-circular recesses in the adjacent faces of the front plate 86 and the gauge plates 98. Upon turning the adjusting screws the gauge plates 98 are accordingly moved up or down to adjust the slot between the rolls and the lower ends of the gauge plates to the required width. As explained above, this width should be greater than the thickness of a single tap strap and less than the thickness of two tap straps. Upon each rotation of the friction rolls 94 in a clockwise direction, as viewed in Figs. 4 to 6, a single tap strap is removed from the bottom of the stack and projected through the slot between the rolls and the lower edges of the gauge plates. This tap strap is completely ejected due to the location of the friction rolls adjacent the front plate 86. The brooming of the tap straps due to the squeezing of the front edges of the tap straps between the friction rolls and the projections 93 reduces the friction on the rear part of the tap straps and facilitates the ejection. Upon ejection the tap strap passes between guides 97a and 97b carried by the ejector and is guided to a position parallel to the foil. The successive positions of the tap strap after ejection are diagrammatically indicated in Fig. 8. The tap strap finally assumes a position between and parallel to the strips of foil and paper and moving in the same direction as the strips. The tap strap ejector is conditioned for the ejection of a succeeding tap strap by rotating the rolls 94 in a counterclockwise direction. This operation may be either manual or automatic. In the present construction the tap strap ejector is operated by a solenoid 105 connected to one end of a lever 106 pivoted at 107 and having a segment gear 108 at the opposite end. The segment gear meshes with a pinion 109 connected to the shaft 86. The solenoid is biased to the position illustrated by a tension spring 110. When the solenoid is energized the segment gear 108 is turned in a counterclockwise direction, turning the pinion 109 in a clockwise direction and ejecting one of the tap straps in the manner described above. When the solenoid is deenergized the parts are returned by the tension spring 110 to the position illustrated. The operation of the solenoid may either be controlled manually by a switch 111 or automatically in a manner hereinafter described. For convenience, no illustration is made of the drive for the tap strap ejector at the left in Fig. 1.

The machine is controlled by mechanism driven through a friction wheel 112 rotatably carried in a hinged arm 113 and biased by gravity into engagement with one of the paper rolls 29. The rotation of the friction wheel 112 is accordingly a measure of the length of paper and foil fed to the mandrel. The capacity of the finished condenser is very nearly proportional to the length of paper and foil wound on the mandrel. Since both the paper and the foil vary in thickness, there will be considerable variation in the number of turns of the mandrel required to wind the given length of foil paper, and there will also be considerable variation in the diameter of the finished condenser. By using the length of foil and paper wound on the mandrel to control the machine, condensers of suitably uniform capacity are obtained.

The friction wheel 112 drives control chains 114 through a speed reducing drive comprising a worm 115 rotated by a gear 116 driven by a chain 117 in turn driven by a gear 118 fixed to the friction roller shaft 119. The worm 115 drives a gear 120 fixed to a shaft 121 to which are fixed control chain drive gears 122. The chain 117 provides a driving connection between the friction wheel 112 and the worm 115 which is independent of the angular position of the friction wheel supporting arm 113. The drive is accordingly independent of the diameter of the paper roll against which the friction wheel bears. The control chains 114 are spaced apart along the shaft 121. Fixed between the chains are plates 123 and 124 carrying adjustable members for controlling the operation of the solenoids effecting the various operations of the machine. The length of the control chains 114 is adjustable by adding or subtracting links to make the machine effective for winding different sizes of condensers.

The speed of the motor 3 is controlled by a member 125 on the plate 123. The member 125 cooperates with a spring contact arm 126 and raises it into engagement with a bar 127 connected to the control circuit supply conductor 23. When the spring contact arm 126 engages the bar 127 a circuit is completed to the solenoid 18 from conductor 23 through the bar 127, contact 126, and conductor 128 to the solenoid 18, and from the solenoid 18 through conductor 24 to conductor 22. This energizes the solenoid 18, opening the contacts 17 and opening the short circuit around the resistance 14. This connects the resistance 14 in series with the motor and reduces the motor speed.

The foil cutters 61 and 62 are controlled by a member 129 which cooperates with a spring contact 130 to close a circuit through the foil cut-off solenoid 63. This circuit extends from conductor 23 through the bar 127, spring contact 130, and conductor 131 to the solenoid, and from the solenoid through conductor 132 to conductor 22. When the solenoid 63 is energized, the rack 64 is moved to the left, rotating the cutters 62 through the gears 65, 67, 68, and 69. When the member 129 moves from under the spring contact 130, the circuit to the solenoid is opened and the spring 66 returns the rack to the position illustrated, the cutters remaining stationary due to the ratchet drive. The foil feed rolls 35 and 35a are controlled by a member 133 which cooperates with a spring contact 134 to close a circuit through the foil feed roll solenoid 57. This circuit extends from conductor 23 through the bar 127, contact 134, conductor 135 to the solenoid 57, and from the solenoid 57 through conductors 136 and 132 to conductor 22. When the solenoid 57 is energized, the inner ends of the links 58 are raised, thereby moving the rolls 35 against the rolls 35a and causing the foil to be fed downward toward the mandrel. The rolls 35 and 35a, as described above, are driven continuously but are effective to feed the foil only when in engagement. When the member 133 moves past the spring contact 134, the circuit to the solenoid 57 is opened and the feed rolls 35 moved by gravity away from the rolls 35a, stopping the feed of foil.

The paper-cutting knives 71 are controlled by a member 137 which cooperates with a spring contact 138 to close a circuit through the paper cut-off solenoid 76. This circuit extends from conductor 23 through the bar 127, spring contact arm 138, and conductor 139 to the solenoid, and from the solenoid through conductor 140 to conductor 22. When the solenoid 76 is energized, it moves the rack 74 to the right, rotating the cutter knives 71 through gears 73 and 75. When the member 137 moves from under the spring contact arm 138, the circuit to the solenoid 76 is opened and the rack 74 is returned by the tension spring 77 to the position illustrated.

The paper feed rolls 32 and 32a are controlled by a member 141 which cooperates with a spring contact 142 to close a circuit through the paper feed solenoid 53. This circuit extends from the conductor 23 through bar 127, spring contact arm 142, and conductor 143 to the solenoid, and from the solenoid through conductors 144 and 140 to conductor 22. When the solenoid 53 is energized, the bell crank 54 is pivoted in a counterclockwise direction, moving the roll 32 into engagement with the roll 32a and rendering the rolls effective to feed paper toward the mandrel. When the member 141 moves from under the spring contact 142, the circuit to the solenoid 53 is opened and the feed roll 32 is moved by gravity away from the feed roll 32a, stopping the feed of paper.

The tap strap ejectors are controlled by a member 145 on the plate 124. The member 145 cooperates with a spring contact 146 to control a circuit to the solenoid 105. This circuit extends from conductor 23 through bar 127, contact 146 and conductor 147 to the solenoid, and from the solenoid through conductors 148 and 140 to conductor 22. When the solenoid 105 is energized, it is moved to the left, rotating the shaft 96 and turning the friction rolls 74 in a clockwise direction to eject a tap strap. When the member 145 moves from under the spring contact 146, the circuit to the solenoid is opened and the parts are returned by the spring 110 to the position illustrated.

The machine is stopped by a member 149 which cooperates with a spring contact 150 and controls a circuit to the solenoid 28. This circuit extends from conductor 23 through bar 127, contact 150, and conductor 151 to the solenoid, and from the solenoid through conductor 24 to the conductor 22. When the solenoid is energized, the contacts 27 are opened, opening the holding circuit for the solenoid 11a and deenergizing the solenoid 11a. This causes the opening of the contacts 11, thereby opening the motor circuit as described above.

After being stopped through the action of member 149, the motor may be started again by momentarily closing the switch 21 as described above. The switch 21 must be held closed until the member 149 has moved away from the spring contact 150, after which the switch may be opened.

At the start of the condenser winding operation, the lower ends of the paper and foil project a short distance below the mandrel, with the ends of the paper projecting a sufficient distance beyond the ends of the foil to provide the necessary insulation. The control member 149 is in engagement with the spring contact 150, completing a circuit through the solenoid 28, and the switch 21 is open. All of the other control members carried by the plates 123 and 124 are clear of the respective cooperating spring contacts.

Before starting the operation of the machine, the operator first secures the free ends of the foil and paper between the parts of the split mandrel. The machine is now started by manually closing the switch 21 to energize the motor starting solenoid 11a. This closes the motor circuit through contacts 11 and causes the mandrel to be rotated by means of the belt 4 and the pulleys 5 and 6, and also causes the feed rolls 32, 32a, and 35 and 35a to be rotated by the chain 37 and the associated gearing. The feed rolls are separated and accordingly are ineffective. The rotation of the mandrel winds the paper and foil on the mandrel and drives the control chains 114 through the friction wheel 112, bearing on one of the paper rolls 29. The switch 21 is held closed until the chains 114 have moved sufficiently to move the member 149 away from the spring contact 150, opening the circuit to the solenoid 28. The switch 21 may then be opened, the circuit to the motor control solenoid 11a being now maintained by the holding circuit established by the closure of contacts 26.

At a point in the condenser winding operation determined by the position of the plate 124, the member 145 engages the spring contact 146 and closes a circuit to the tap strap ejector solenoid 105. This causes the rotation of the friction rolls 94 in a clockwise direction, as viewed in Figs. 4 to 6, ejecting tap straps. The tap straps are ejected while the condenser is being wound at full speed. Heretofore it has been necessary to stop the machine and insert the tap straps by hand. When the member 145 moves from under the spring contact 146, the circuit to the tap strap ejector solenoid is broken and the parts are returned by the spring 110 to the position illustrated.

After nearly all of the desired length of foil and paper is wound on the mandrel, the member 125 on the plate 123 engages the spring contact 126 and closes the circuit to the solenoid 18, energizing the solenoid and causing the opening of the contacts 17 to remove the short circuit around the resistance 14. This inserts the resistance 14 in series with the motor and reduces the motor speed, effecting a corresponding reduction in the mandrel speed. The slowing of the mandrel speed is desirable to reduce the rate of travel of the foil and paper so that the subsequent cutting and feeding operations may be performed without excessive strain. The members on the plate 123 are arranged so that the motor has a sufficient interval of time in which to reach its slow speed before any of the subsequent operations is started. At the end of this interval, i. e., after the motor has reached its slow speed, the member 129 engages the spring arm 130 and completes a circuit to the foil cutoff solenoid 63. The energization of this solenoid causes the rack 64 to be moved to the left, thereby rotating the cutters 62 through the gears 66, 67, 68, and 69. When the member 129 moves from under the spring contact 136, the circuit to the solenoid 63 is opened and the rack is returned by the spring 66 to the position illustrated. At this time the feed of foil from the rolls 33 stops and the end of the foil connected to the mandrel continues to be wrapped on the mandrel together with the paper. After a suitable interval, during which time the end of the foil connected to the mandrel moves away from the end of the foil connected to the rolls, the member 133 engages the spring contact 134 and closes a circuit to the foil feeding solenoid 57. The energization of this solenoid moves the rolls 35 into engagement with the rolls 35a and starts the feeding of the foil from the rolls toward the mandrel. The rate of feed of foil from the rolls is substantially equal to the rate at which the paper and foil are being wrapped on the mandrel. Due to the time delay between the foil cutting and the starting of the foil feeding, a gap is provided between the adjacent ends of the foil. When the approximate center of the gap between the severed ends of the foils is opposite the paper cutting knives 71, the member 137 engages the spring contact 138 and energizes the paper cutting solenoid 76. This causes the rack 74 to be moved to the right, rotating the knives 71 through the gears 73 and 75. The member 137 remains in engagement with the spring contact 138 long enough for the cutting operation to take place, after which it moves clear of the spring contact 138, deenergizing the solenoid 76. The rack 74 is then returned by the spring 77 to the position illustrated. About the same time as the operation of the paper cutters 71, the member 141 engages the spring contact 107 and closes the circuit through the paper feeding solenoid 53. The energization of this solenoid causes the roll 32 to be moved into engagement with the roll 32a, thereby feeding the paper downward toward the mandrel at the same rate as the foil. Since the paper was severed at the approximate center of the gap between the adjacent ends of the foil, both ends of the paper overlap the respective ends of the foil to provide the necessary insulation. The foil and paper feeding continue until the lower ends are a short distance below the mandrel, at which time the member 149 engages the spring contact 150 and closes the circuit to the solenoid 28. The operation of the solenoid 28 opens the contacts 27 in the holding circuit of the motor control solenoid 11a, deenergizing the solenoid 11a and thereby stopping the motor by opening the contacts 11.

The tap strap ejector shown in Fig. 7 operates in the same manner as the construction shown in Figs. 2 to 6 inclusive described above, and different from the previously described construction in features which facilitate the loading of tap straps.

The tap strap ejector has a channel-shaped frame having a vertical back wall 152 and top and bottom walls 153 and 154. The front wall of the frame comprises a plate 155 hinged at 156 on the front edge of the top wall 153 and held in position by hooks 157 having shanks 158 pivotally secured to the plate 155 and having arms 159 which cooperate with the back wall 152 to hold the front plate 155 in position. Upon pivoting the shanks 158 the arms 159 are moved to a vertical position illustrated in dotted lines, so that the plate 155 may be swung outward to permit the loading and unloading of the tap straps. As in the previously described construction, the stack of tap straps is pressed downward by coil springs 160 arranged between the top wall 153 and the upper side of a pressure bar 161. The lower ends of the springs 160 surround studs 162 on the pressure bar which prevent buckling of the springs. Adjacent the front edge of the bottom wall 154 is a slot 163 slidably receiving a bearing 164 for a shaft 165 carrying friction rolls 166. The vertical position of the friction rolls 166 is adjusted by means of an adjusting stud 167 threaded in the bottom wall 154. The stud is held in the adjusted position by a lock nut 168. By this means the rolls may be shifted up and down so that the top surface of the rolls is spaced from the edge 169 of the front plate 155 a distance greater than the thickness of one tap strap but less than the thickness of two tap straps. As in the previously described construction, the friction rolls 166 are closer to the front plate 155 than to the back wall 152. When the friction rolls are rotated in a clockwise direction, the lowermost tap strap is frictionally gripped by the rolls and ejected through the slot between the top surface of the rolls and the edge 169 of the front plate 155. The tap strap ejector is conditioned for the succeeding operation by rotating the friction rolls 166 in a counterclockwise direction to return the rolls to the initial position.

What I claim as new and desire to secure by Letters Patent of the United States is:

1. In a machine for winding condensers having provisions for feeding strips of material along spaced paths to winding means, a tap strap ejector comprising a frame arranged between adjacent paths for holding a stack of tap straps extending transverse to said paths, means engaging the ends of the stack for compressing the stack therebetween, said means including a friction roll at one end of the stack, means engaging the edges of the stack for retaining therein all except the tap strap in contact with said roll, and means for rotating said roll to move the tap strap in contact therewith off the stack.

2. In a machine for winding condensers having provisions for feeding strips of material along spaced paths to winding means, a tap strap ejector comprising a frame arranged between adjacent paths for holding a stack of tap straps extending transverse to said paths, means engaging the ends of the stack adjacent the front edges thereof for compressing the stack therebetween and causing the tap straps to broom at the rear edges of the stack, said means including a friction member at one end of the stack, means cooperating with the front edge of the stack for retaining therein all except the tap strap in contact with said member, and means for moving said member in a direction to move the tap strap in contact therewith off the stack.

3. In a machine for winding condensers having provisions for feeding strips of material along spaced paths to winding means, a tap strap ejector arranged between adjacent paths for holding a tap strap in a position such that the length of the tap strap is transverse to said paths, and means for ejecting the tap strap transverse to its length.

4. In a machine for winding condensers having provisions for feeding strips of material along spaced paths to winding means, a tap strap ejector arranged between adjacent paths for holding a tap strap in a position such that the length of the tap strap is transverse to said paths, and means for ejecting the tap strap transverse to its length, said means including a friction wheel engaging the tap strap and means for rotating the wheel.

5. In a machine for winding condensers, means for feeding strips of material along spaced vertical paths to winding means, means for holding a tap strap in a horizontal position between adjacent paths with the tap strap extending transverse to the paths, and means for ejecting said tap strap horizontally toward one of said paths.

6. In a machine for winding condensers, means for feeding strips of material along spaced vertical paths to winding means, means for holding a stack of tap straps in a horizontal position between adjacent paths with the tap straps extending transverse to the paths, a friction member engaging the tap strap at one end of the stack strap for ejecting said tap strap horizontally toward one of said paths while the material is being fed to the winding means, and means for retaining in the stack the tap straps out of contact with said friction member.

7. In a machine for winding condensers having provisions for feeding strips of material along spaced paths to winding means, a tap strap ejector comprising a frame arranged between adjacent paths for holding a stack of tap straps extending transverse to said paths, means engaging the ends of the stack for compressing the stack therebetween, said means including a friction member at one end of the stack, means cooperating with said friction member to define a slot of sufficient width to permit the passage of one tap strap but of insufficient width to permit the passage of more than one tap strap, and means for moving said friction member to eject through said slot the tap strap in contact therewith.

8. In a machine for winding condensers having provisions for feeding strips of material along spaced paths to winding means, a tap strap ejector comprising a frame arranged between adjacent paths for holding a stack of tap straps extending transverse to said paths, a friction roll engaging one end of said stack adjacent the front edge of the stack, a member engaging the other end of the stack, said member tapering away from the stack from the front toward the rear edge of the stack, a plate cooperating with the friction roll to define a slot at the front edge of the stack having a width greater than the thickness of one tap strap but less than the thickness of two tap straps, and means for rotating the roll in a direction to eject the tap strap in contact therewith through said slot.

CLIFFORD S. WEST.